(12) United States Patent
Hamilton

(10) Patent No.: US 12,553,262 B2
(45) Date of Patent: Feb. 17, 2026

(54) VALUABLE SECURING DEVICE FOR VEHICLES

(71) Applicant: Rob Hamilton, Plainview, TX (US)

(72) Inventor: Rob Hamilton, Plainview, TX (US)

(*) Notice: Subject to any disclaimer, the term of this patent is extended or adjusted under 35 U.S.C. 154(b) by 36 days.

(21) Appl. No.: 18/769,363

(22) Filed: Jul. 10, 2024

(65) Prior Publication Data
US 2025/0270856 A1    Aug. 28, 2025

Related U.S. Application Data

(63) Continuation-in-part of application No. 17/931,530, filed on Sep. 12, 2022, now Pat. No. 12,065,104, which is a continuation-in-part of application No. 17/366,989, filed on Jul. 2, 2021, now Pat. No. 11,512,915.

(60) Provisional application No. 63/558,648, filed on Feb. 28, 2024, provisional application No. 63/242,933, filed on Sep. 10, 2021, provisional application No. 63/121,420, filed on Dec. 4, 2020.

(51) Int. Cl.
E05B 73/00    (2006.01)

(52) U.S. Cl.
CPC ............................... *E05B 73/00* (2013.01)

(58) Field of Classification Search
CPC ..... B60R 7/10; B60R 7/12; B60R 2011/0059; B60R 2011/0071; B60R 2022/3475; B60R 22/42; E05B 73/00
USPC ...................................... 70/58; 292/256, 305
See application file for complete search history.

(56) References Cited

U.S. PATENT DOCUMENTS

| | | | | |
|---|---|---|---|---|
| 5,222,381 A * | 6/1993 | Wilcox | ............... | B60R 25/0225 D8/343 |
| 6,473,302 B1 * | 10/2002 | Korycan | ............. | B60R 11/0241 361/679.41 |
| 7,104,095 B1 * | 9/2006 | Lin | ..................... | A44B 11/2573 70/284 |
| 8,449,002 B2 * | 5/2013 | Nagy | ....................... | F16J 13/06 292/257 |
| 10,301,851 B1 * | 5/2019 | Cummings | ............. | B60R 11/00 |
| 2002/0023324 A1 * | 2/2002 | Kobayashi | ............... | B60R 22/00 24/633 |
| 2011/0132950 A1 * | 6/2011 | Culver | ................. | B60R 11/0241 224/485 |
| 2015/0183381 A1 * | 7/2015 | Earley | ................. | B60R 11/0252 224/275 |
| 2016/0355139 A1 * | 12/2016 | Noonan | .................... | B60R 7/04 |

(Continued)

*Primary Examiner* — Nathan Cumar
(74) *Attorney, Agent, or Firm* — Shannon Warren

(57) ABSTRACT

A security assembly configured to interface with a seat belt receiver for securing items within a vehicle. The security assembly comprises a clamp assembly. The clamp assembly comprises a buckle portion, a first loop portion, and a second loop portion. The clamp assembly is adjustable between an enclosed configuration and an open configuration to accommodate various securement needs. The first loop portion and the second loop portion are rotateably attached to one another with a hinge and selectively rotate about a hinge axis. The clamp assembly comprises the enclosed configuration and the open configuration. The enclosed configuration comprises the first loop portion and the second loop portion selectively transitioned to enclose an enclosed loop between the enclosed configuration and the open configuration.

18 Claims, 18 Drawing Sheets

(56) References Cited

U.S. PATENT DOCUMENTS

2018/0251080 A1\* 9/2018 McLaughlin .......... B60R 22/00

\* cited by examiner

VALUABLE SECURING DEVICE FOR VEHICLES

CROSS-REFERENCE TO RELATED APPLICATIONS

This application claims the benefit of and takes priority from the following previously filed applications, which are hereby incorporated by reference in their entirety:

U.S. Provisional Patent Application No. 63/143,933 entitled "Gun Lock," filed on Dec. 4, 2020; U.S. Nonprovisional patent application Ser. No. 17/366,989 entitled "Gun Lock," filed on Jul. 2, 2021, which issued as U.S. Pat. No. 11,512,915; U.S. Provisional Patent Application No. 63/242,933 entitled "Gun Lock," filed on Sep. 10, 2021; and U.S. Nonprovisional patent application Ser. No. 17/931,530 entitled "Gun Lock," filed on Sep. 12, 2022.

Likewise, this nonprovisional application claims benefit to its own provisional application No. 63/558,648 filed Feb. 27, 2024.

Incorporation by reference of the above-mentioned applications is made to provide continuity of disclosure and to extend any potential patent term adjustments or extensions afforded under 35 U.S.C. § 120, as well as to potentially benefit from earlier effective filing dates as provided by 35 U.S.C. § 119 (e).

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

The invention pertains to the domain of devices, specifically focusing on a clamp assembly 100. This said clamp assembly 100 is an integral component of a larger a security assembly 102, designed for the securement of portable items within a vehicle to prevent unauthorized removal.

In the context of vehicular safety and security, the challenge has been to thwart the efforts of thieves, who may forcibly enter vehicles to take possession of visible items. Such incidents are not uncommon, with offenders breaking windows to access or even as an act of vandalism against locked vehicles. Recognizing the insufficiency of conventional vehicular security measures for personal belongings, the invention proposes an innovative approach utilizing the vehicle's inherent safety features, such as a seat belt receiver 104, as a novel anchorage point.

The said clamp assembly 100 embodies an advanced security solution that seamlessly integrates with the said seat belt receiver 104, establishing a sturdy and reliable attachment point for belongings. This assembly forms a part of the comprehensive said security assembly 102, which can be embedded within the vehicle's existing framework, thereby broadening the scope of items it can secure.

A key advantage of the said clamp assembly 100 lies in its structural components, which include a buckle portion 106, a first loop portion 108 and a second loop portion 110, a hinge 112, and a mating portion 116. Together, these elements coalesce to secure an enclosed loop 118, which, in turn, can be used to fasten a bag equipped with corresponding zippers featuring eyelets for loop reception. The said clamp assembly 100 thus serves as a locking and anchoring apparatus within the vehicle, significantly enhancing the security of the bag.

The design of the said clamp assembly 100 caters to multiple configurations, bestowing upon it versatility and user-friendly operation. The said mating portion 116 of the assembly, incorporating a tab portion 500 and a slot portion 502, facilitates an effortless yet secure lock-in mechanism when in the an enclosed configuration 120.

To elevate security levels, the invention can be furnished with a lockable buckle enclosure assembly 800 that interfaces with the said seat belt receiver 104. This assembly can encompass diverse locking mechanisms such as a combination lock 806, key systems, or electronic release assemblies compatible with smart devices, permitting a tailored security setting as per the user's preference.

The invention is a progression from prior art, addressing the pressing need for an integrated, flexible, and robust method to safeguard personal items within a vehicle. By employing the said clamp assembly 100 and the encompassing said security assembly 102, users are empowered to protect their possessions effectively, significantly reducing the likelihood of theft and offering reassurance in the security of their personal items.

No prior art is known to the Applicant.

BRIEF SUMMARY OF THE INVENTION

A security assembly 102 configured to interface with a seat belt receiver 104 for securing items within a vehicle. Said security assembly 102 comprises a clamp assembly 100. Said clamp assembly 100 comprises a buckle portion 106, a first loop portion 108, a second loop portion 110. Said clamp assembly 100 is adjustable between an enclosed configuration 120 and an open configuration 300 to accommodate various securement needs. Said first loop portion 108 and said second loop portion 110 are rotateably attached to one another with a hinge 112 and selectively rotate about a hinge axis 114. Said clamp assembly 100 comprises said enclosed configuration 120 and said open configuration 300. Said enclosed configuration 120 comprises said first loop portion 108 and said second loop portion 110 selectively transitioned to enclose an enclosed loop 118 between said enclosed configuration 120 and said open configuration 300. With said first loop portion 108 and said second loop portion 110 in said enclosed configuration 120, said clamp assembly 100 comprises said enclosed loop 118 within said first loop portion 108 and said second loop portion 110. Said clamp assembly 100 further comprise a mating portion 116. Said buckle portion 106 and said first loop portion 108 comprise a solid piece. Said buckle portion 106 extends down from said enclosed loop 118. Said buckle portion 106 is configured to selectively mate with said seat belt receiver 104. With said first loop portion 108 and said second loop portion 110 in said enclosed configuration 120, said enclosed loop 118 comprises a substantially round shape with said first loop portion 108 and said second loop portion 110 comprise an exterior shape around said enclosed loop 118. Said second loop portion 110 comprises a proximate end 124 rotateably attached to said hinge 112 and a distal end 122 selectively attached to a portion of said first loop portion 108. Said second loop portion 110 rotates about said hinge axis 114 and connects with said first loop portion 108 at said distal end 122. Said mating portion 116 comprises a portion of said distal end 122 of said second loop portion 110 which connects with said buckle portion 106 and said first loop portion 108.

Said security assembly 102 configured to interface with said seat belt receiver 104 for securing items within a vehicle. Said security assembly 102 comprises said clamp assembly 100. Said clamp assembly 100 comprises said buckle portion 106, said first loop portion 108, said second loop portion 110. Said clamp assembly 100 is adjustable between said enclosed configuration 120 and said open configuration 300 to accommodate various securement needs. Said first loop portion 108 and said second loop portion 110 are rotateably attached to one another with said hinge 112 and selectively rotate about said hinge axis 114. Said clamp assembly 100 comprises said enclosed configuration 120 and said open configuration 300. Said enclosed configuration 120 comprises said first loop portion 108 and said second loop portion 110 selectively transitioned to enclose said enclosed loop 118 between said enclosed configuration 120 and said open configuration 300. With said first loop portion 108 and said second loop portion 110 in said enclosed configuration 120, said clamp assembly 100 comprises said enclosed loop 118 within said first loop portion 108 and said second loop portion 110.

Said security assembly 102 configured to interface with said seat belt receiver 104 for securing items within a vehicle. Said security assembly 102 comprises said clamp assembly 100. Said clamp assembly 100 comprises said buckle portion 106, said first loop portion 108, said second loop portion 110. Said clamp assembly 100 is adjustable between said enclosed configuration 120 and said open configuration 300 to accommodate various securement needs. Said first loop portion 108 and said second loop portion 110 are rotateably attached to one another with said hinge 112 and selectively rotate about said hinge axis 114. Said clamp assembly 100 comprises said enclosed configuration 120 and said open configuration 300. Said enclosed configuration 120 comprises said first loop portion 108 and said second loop portion 110 selectively transitioned to enclose said enclosed loop 118 between said enclosed configuration 120 and said open configuration 300. With said first loop portion 108 and said second loop portion 110 in said enclosed configuration 120, said clamp assembly 100 comprises said enclosed loop 118 within said first loop portion 108 and said second loop portion 110. Said mating portion 116 comprises a tab portion 500 and a slot portion 502 that selectively fit into one another to secure said clamp assembly 100 in said enclosed configuration 120. Said mating portion 116 comprises said tab portion 500 and said slot portion 502. Portion (110) is in said enclosed configuration 120. Said tab portion 500 and said slot portion 502 is arranged on said first loop portion 108 and said second loop portion 110.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
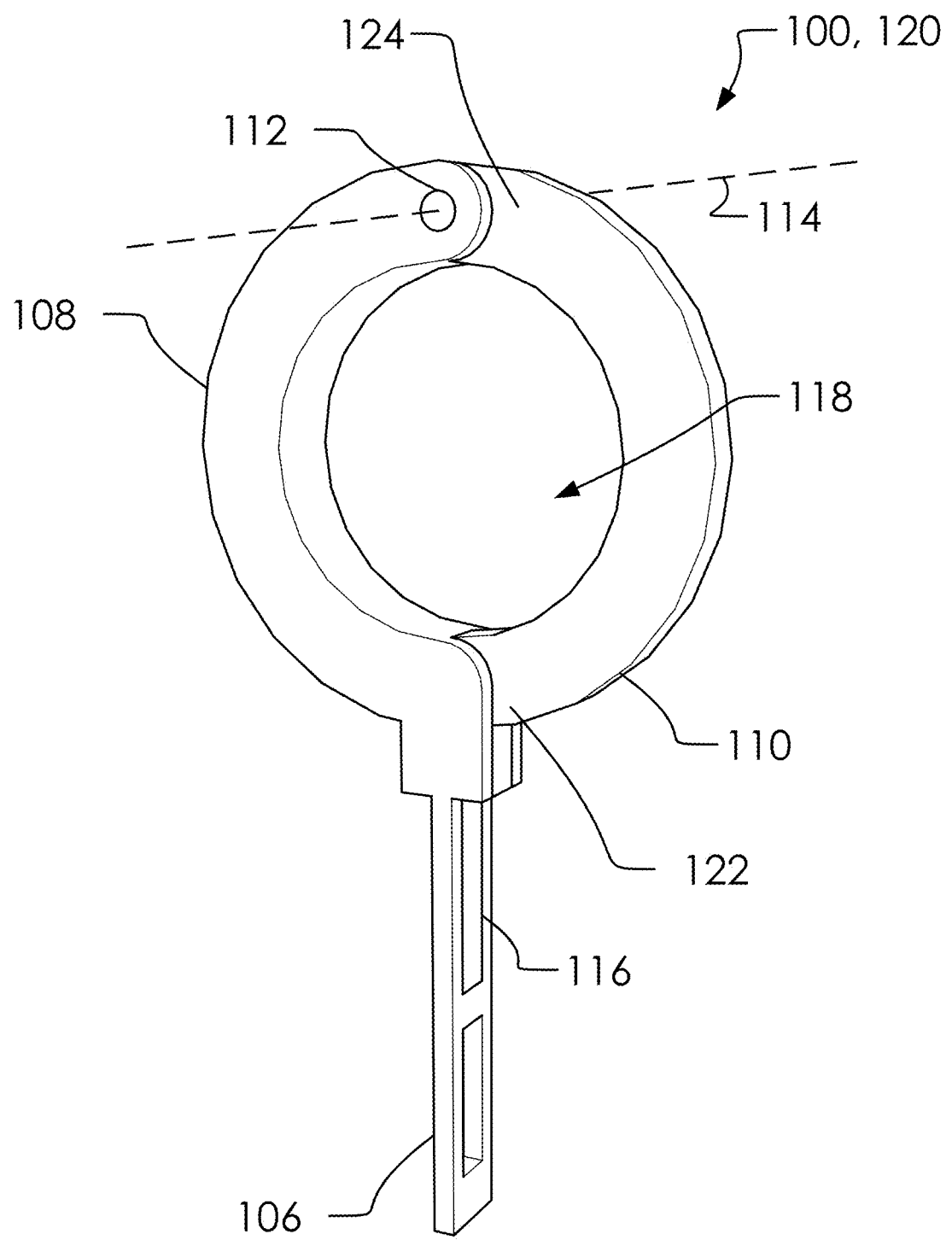
FIG. 1 illustrates a perspective overview of a clamp assembly 100 in an enclosed configuration 120.

FIG. 1 illustrates a perspective overview of a clamp assembly 100 in an enclosed configuration 120.

As discussed and illustrated below, said clamp assembly 100 can comprise a portion of a security assembly 102. Further, said security assembly 102 can be used to secure items in a vehicle having a seat belt receiver 104.

In one embodiment, said clamp assembly 100 can comprise a buckle portion 106, a first loop portion 108, a second loop portion 110, a hinge 112, a hinge axis 114, and a mating portion 116.

In one embodiment, said first loop portion 108 and said second loop portion 110 can selectively enclose around an enclosed loop 118.

In one embodiment, said second loop portion 110 can comprise a proximate end 124 rotateably attached to said hinge 112 and a distal end 122 selectively attached to a portion of said first loop portion 108. Wherein, said second loop portion 110 rotates about said hinge axis 114 and connects with said first loop portion 108 at said distal end 122.

Figure 2:
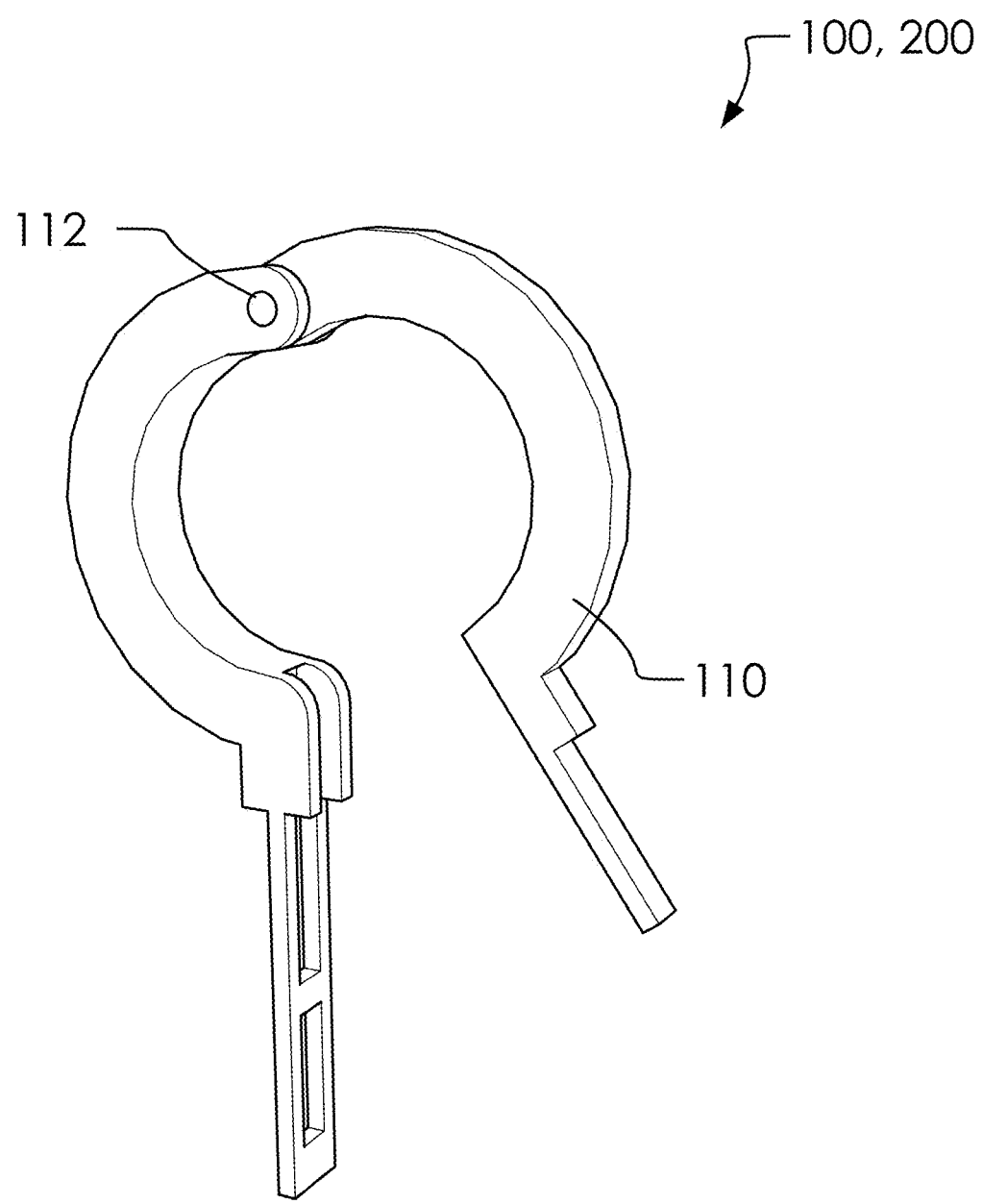
FIG. 2 illustrates a perspective overview of said clamp assembly 100 in a second configuration 200.

FIG. 2 illustrates a perspective overview of said clamp assembly 100 in a second configuration 200.

Figure 3:
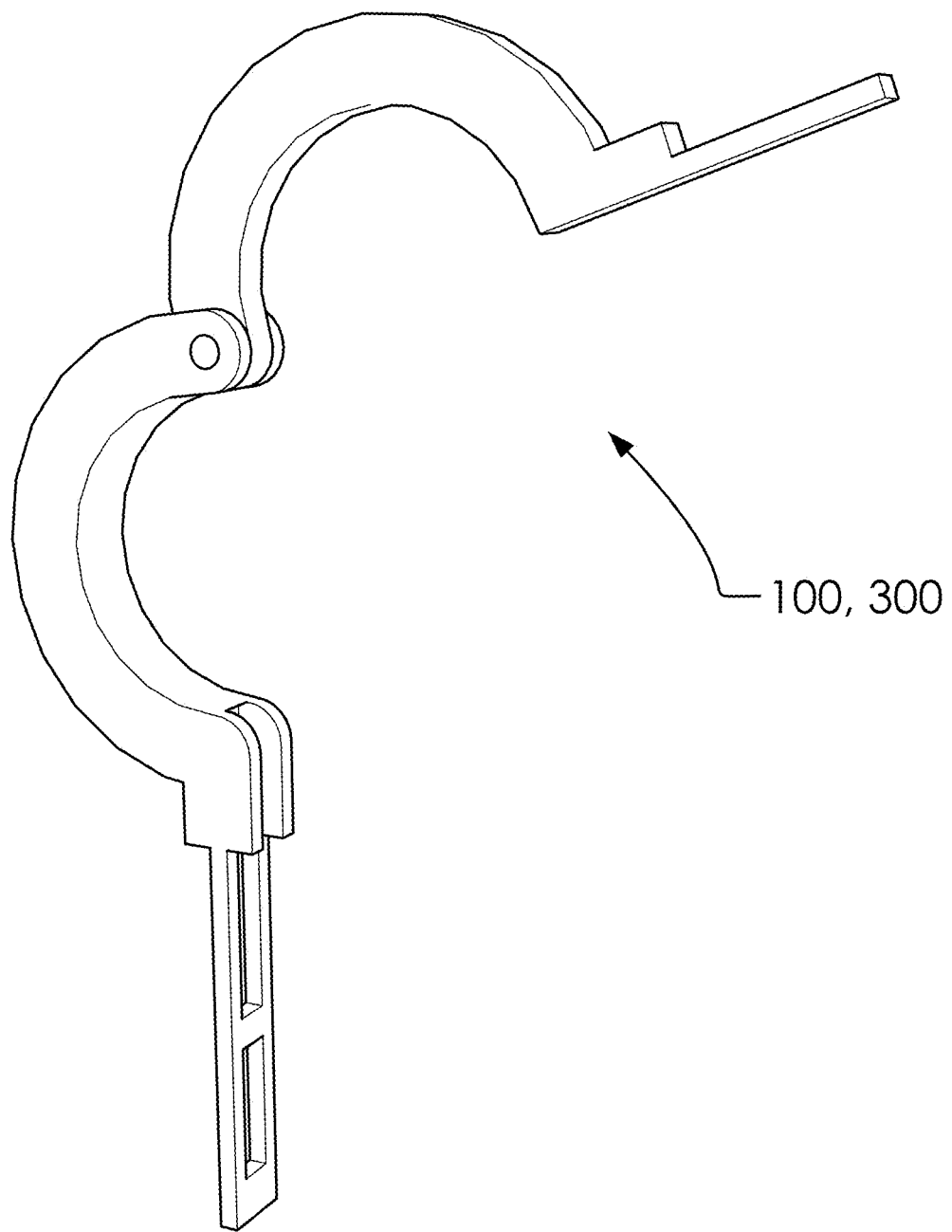
FIG. 3 illustrates a perspective overview of said clamp assembly 100 in an open configuration 300.

FIG. 3 illustrates a perspective overview of said clamp assembly 100 in an open configuration 300.

Figure 4:
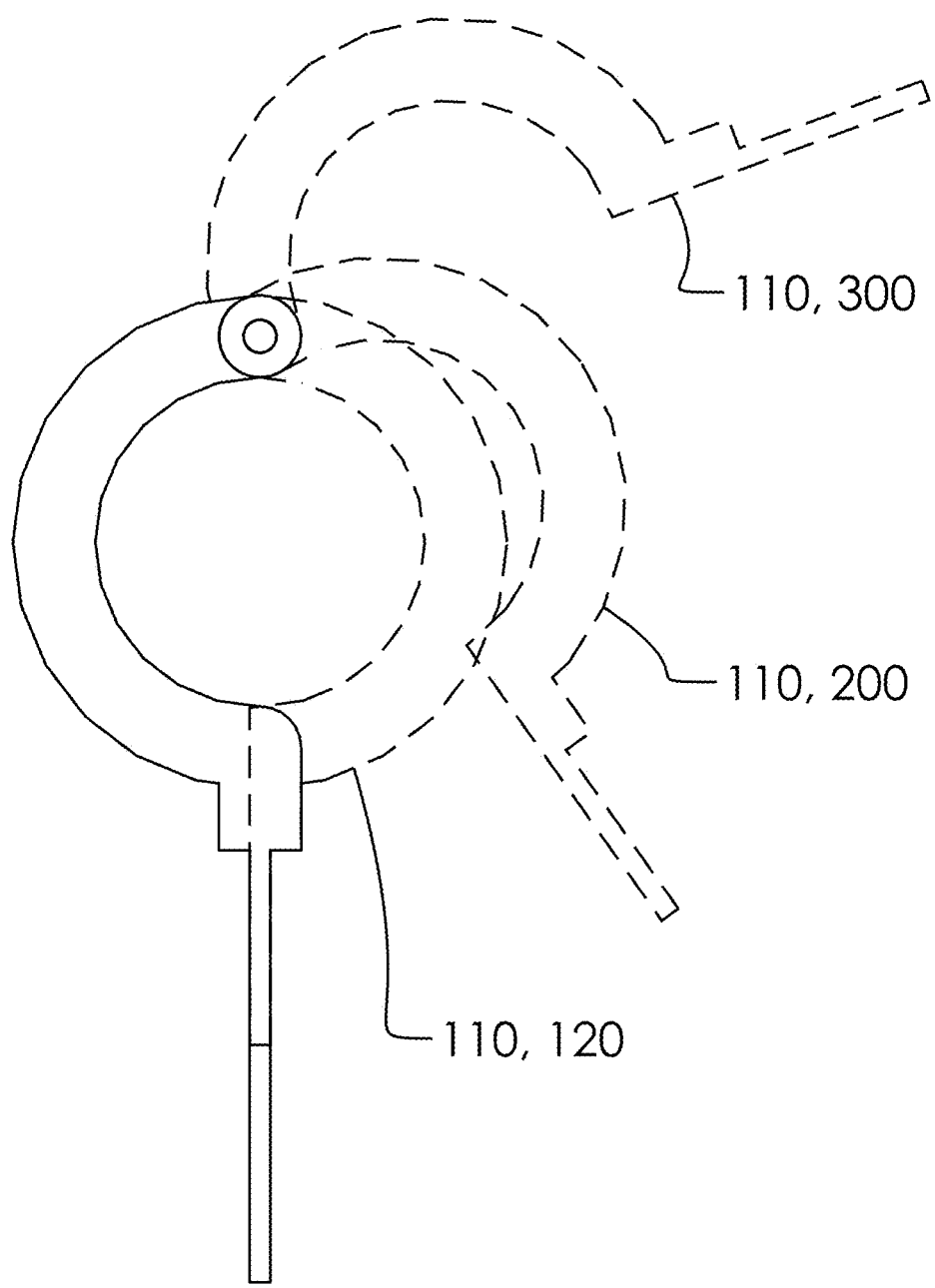
FIG. 4 illustrates an elevated side view of said clamp assembly 100 with a second loop portion 110 in said enclosed configuration 120, said second configuration 200 and said open configuration 300.

FIG. 4 illustrates an elevated side view of said clamp assembly 100 with said second loop portion 110 in said enclosed configuration 120, said second configuration 200 and said open configuration 300.

Figure 5:
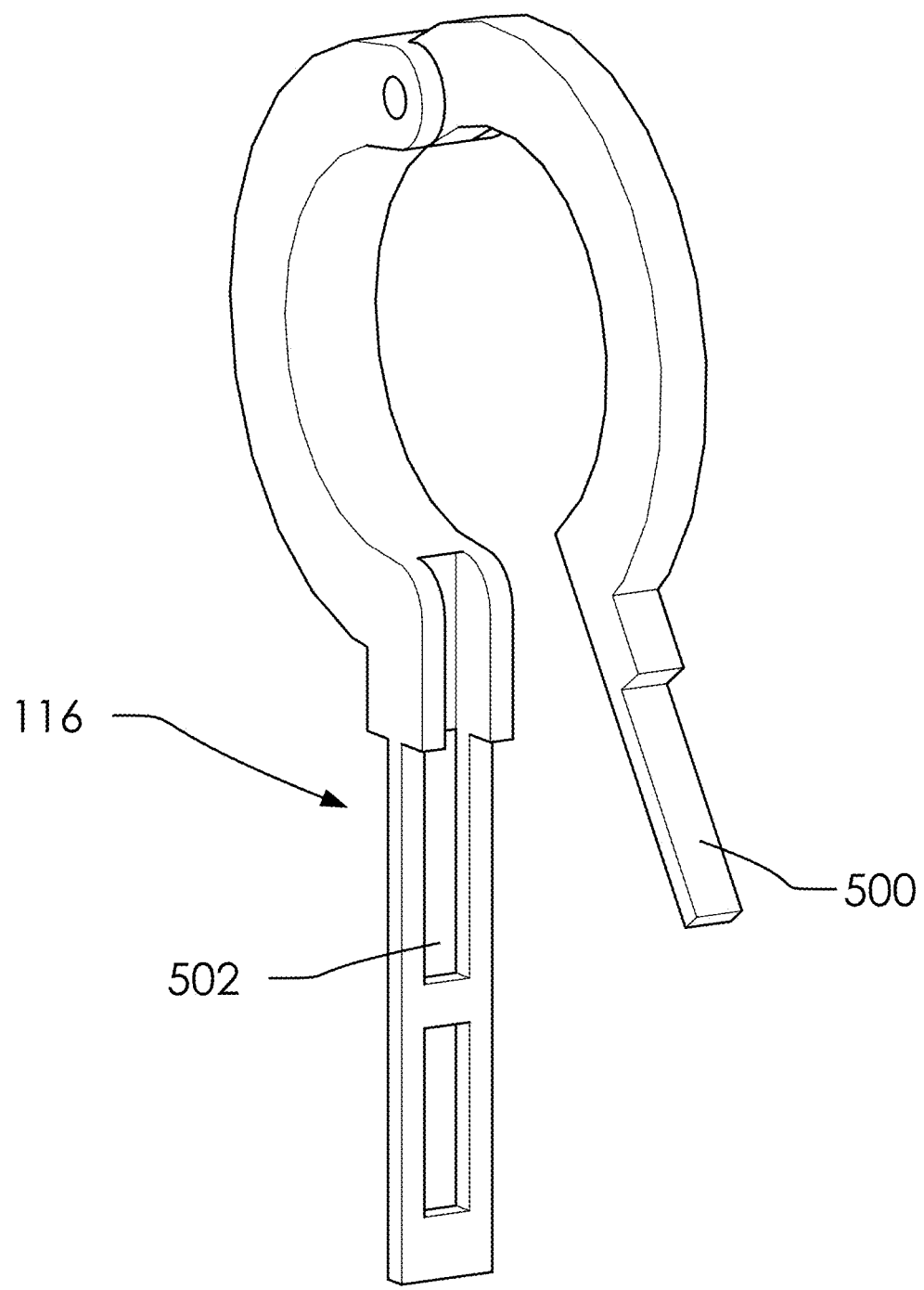
FIG. 5 illustrates a perspective detailed view of a mating portion 116 of said clamp assembly 100.

FIG. 5 illustrates a perspective detailed view of said mating portion 116 of said clamp assembly 100.

In one embodiment, said mating portion 116 can comprise a tab portion 500 and a slot portion 502. In one embodiment, said tab portion 500 and said slot portion 502 can selectively fit into one another when said second loop portion 110 is in said enclosed configuration 120. In one embodiment, said tab portion 500 and said slot portion 502 can be arranged on said first loop portion 108 and said second loop portion 110.

Figure 6:
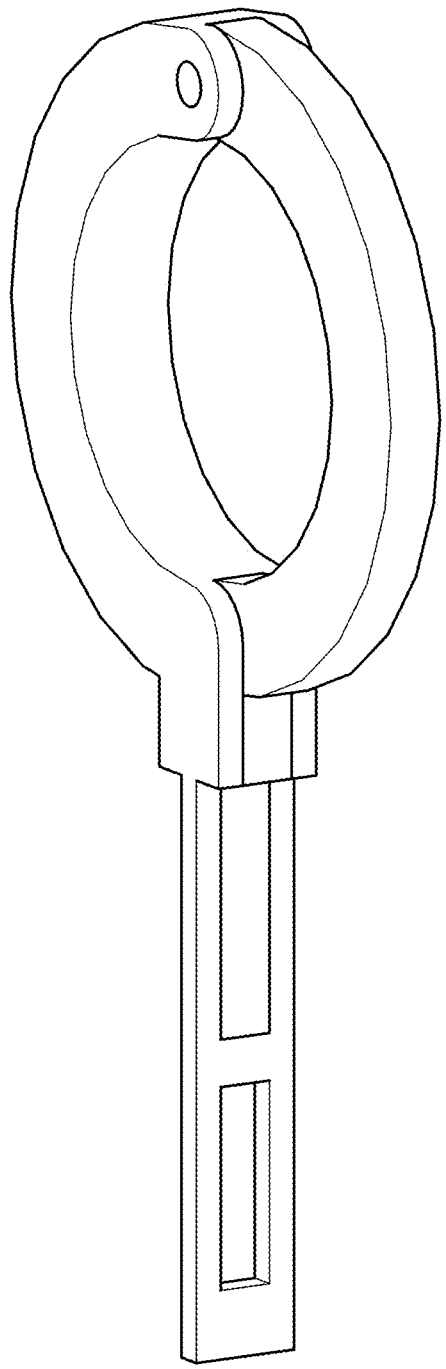
FIG. 6 illustrates a perspective detailed view of said mating portion 116 of said clamp assembly 100 in said enclosed configuration 120.

FIG. 6 illustrates a perspective detailed view of said mating portion 116 of said clamp assembly 100 in said enclosed configuration 120.

Figure 7:
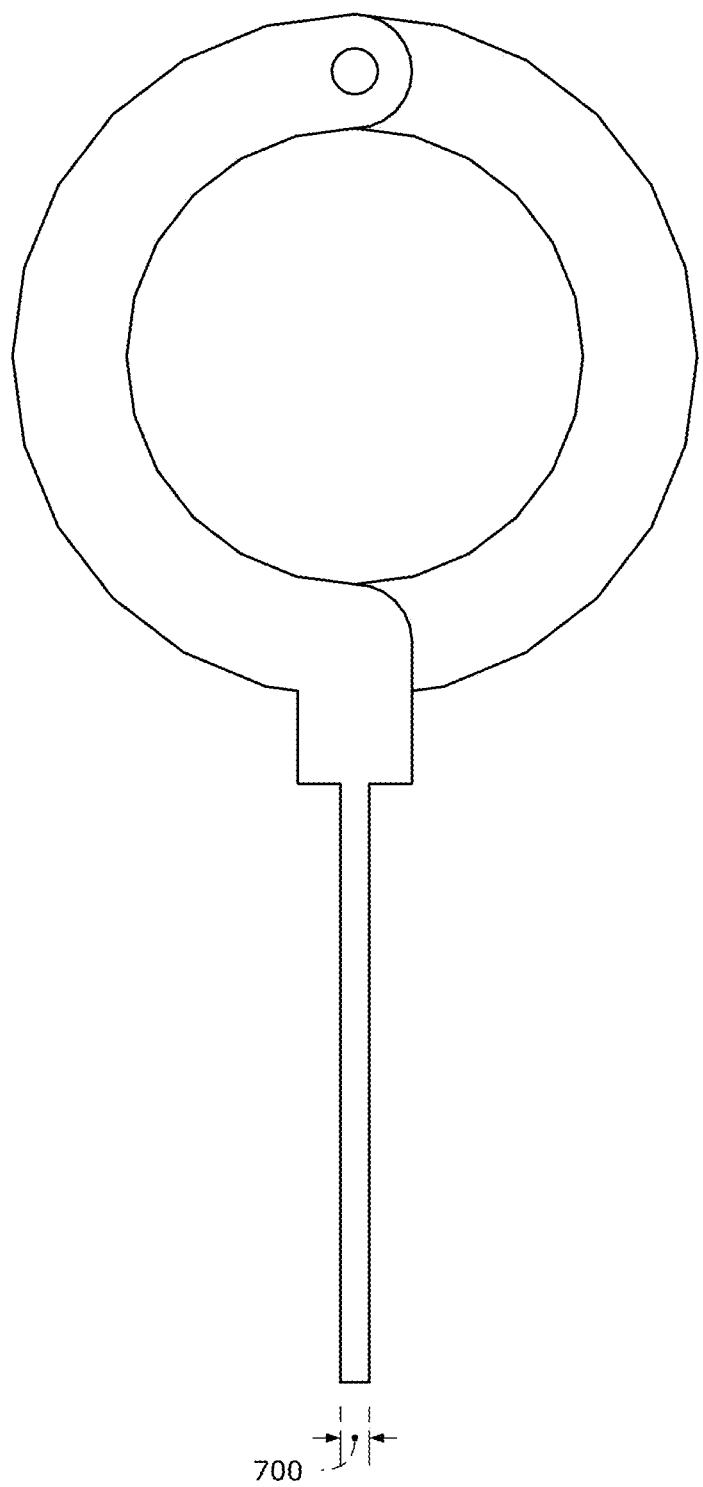
FIG. 7 illustrates an elevated side view of said clamp assembly 100 in said enclosed configuration 120.

FIG. 7 illustrates an elevated side view of said clamp assembly 100 in said enclosed configuration 120.

In one embodiment, with said tab portion 500 in said slot portion 502, said mating portion 116 can comprise a slim profile being substantially equal thickness with a buckle thickness 700 of said buckle portion 106.

Figure 8:
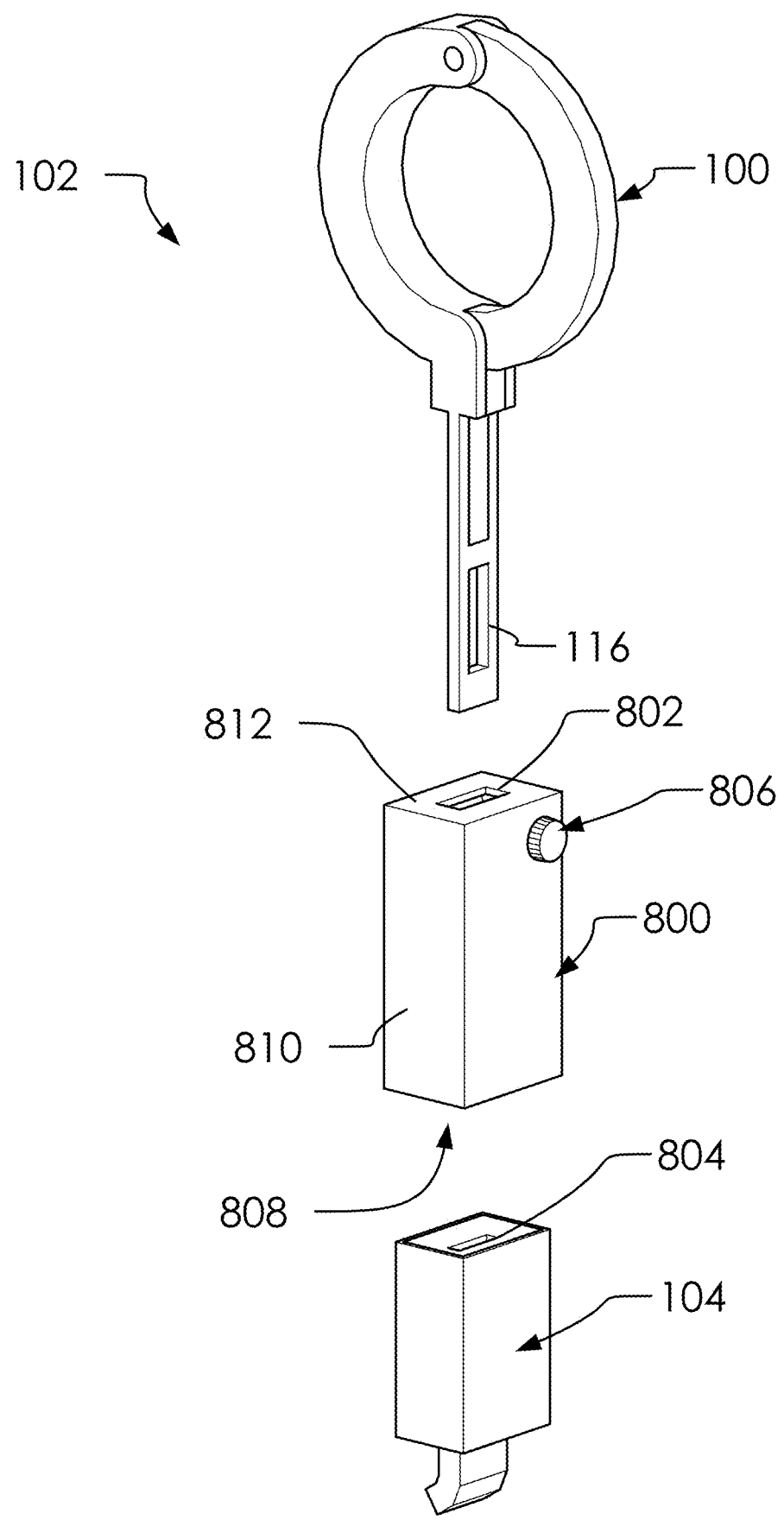
FIG. 8 illustrates a perspective exploded view of a security assembly 102 with a seat belt receiver 104.

FIG. 8 illustrates a perspective exploded view of said security assembly 102 with said seat belt receiver 104.

In one embodiment, said security assembly 102 can comprise said clamp assembly 100 and a lockable buckle enclosure assembly 800. For details of said lockable buckle enclosure assembly 800, please refer to the parent application and registration to this patent, as cited and incorporated above in the cross-reference section of this application.

Said lockable buckle enclosure assembly 800 can comprise a combination lock 806, a buckle slot 802, a buckle receiver cavity 808. Wherein, said buckle receiver cavity 808 is enclosed on its side by a sidewall 810 and about a top portion 812 with a top wall comprising a seat belt receiver buckle slot 804. Further, said lockable buckle enclosure assembly 800 can be configured to enclose said seat belt receiver buckle slot 804 of said seat belt receiver 104 and a top portion of said seat belt receiver 104 to selectively prevent release of said lockable buckle enclosure assembly 800 from said seat belt receiver 104 with said clamp assembly 100 attached to said seat belt receiver 104.

In one embodiment, said combination lock 806 can be configured to selectively trigger said seat belt receiver buckle slot 804 to release said mating portion 116 from said seat belt receiver buckle slot 804 of said seat belt receiver 104.

The following is a summary of one embodiment of said lockable buckle enclosure assembly 800.

In one embodiment, said lockable buckle enclosure assembly 800 can comprise said buckle slot 802 being aligned with said seat belt receiver buckle slot 804 in said seat belt receiver 104. In one embodiment, said buckle portion 106 of said clamp assembly 100 can slide through said buckle slot 802 and said seat belt receiver buckle slot 804 and secure said clamp assembly 100 to said seat belt receiver 104. In one embodiment, said lockable buckle enclosure assembly 800 is configured to selectively prevent removal of said clamp assembly 100 from said seat belt receiver 104.

For example, in one embodiment, said lockable buckle enclosure assembly 800 can comprise said combination lock 806, as illustrated, a key system, and electronic release assembly for pairing with smart devices, or similar, as discussed in the parent applications to this one.

Figure 9:
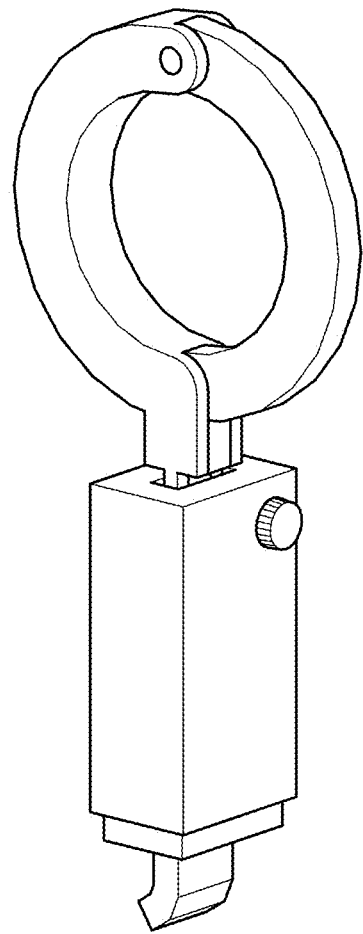
FIG. 9 illustrates a perspective overview of said security assembly 102 fully assembled and attached to said seat belt receiver 104.

FIG. 9 illustrates a perspective overview of said security assembly 102 fully assembled and attached to said seat belt receiver 104.

Figure 10:
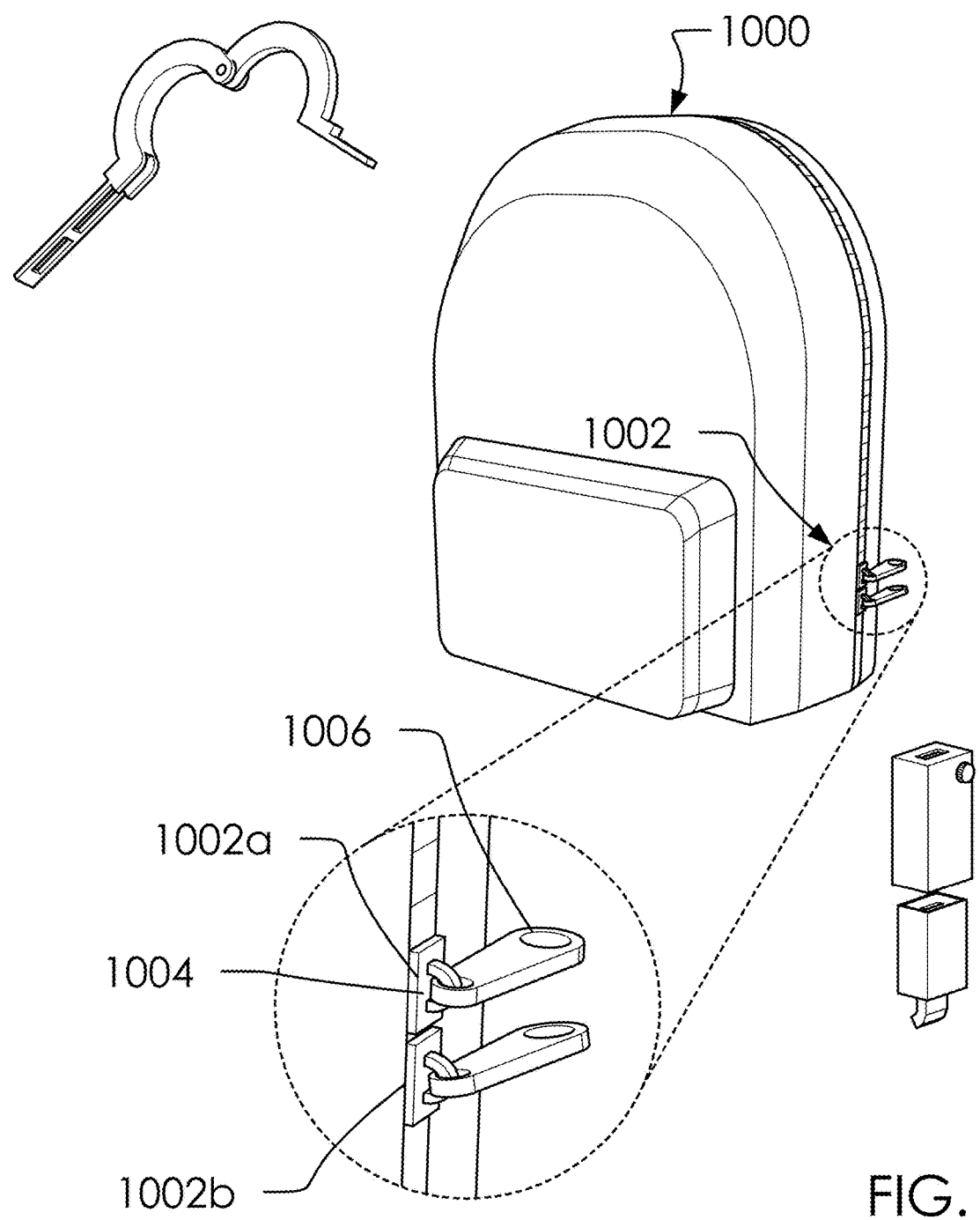
FIG. 10 illustrates a perspective overview of said security assembly 102 with a buckle portion 106 and a lockable buckle enclosure assembly 800 and aligned with a bag 1000.

FIG. 10 illustrates a perspective overview of said security assembly 102 with said buckle portion 106 and said lockable buckle enclosure assembly 800 and aligned with a bag 1000.

In one embodiment, said bag 1000 can comprise one or more zippers 1002 which can comprise a first zipper 1002a and a second zipper 1002b. In one embodiment, said one or more zippers 1002 can each comprise a zipper slider 1004 having an eyelet 1006.

In one embodiment, said security assembly 102 can be used to secure said bag 1000 within a vehicle.

For example, said bag 1000 can be secured to said security assembly 102 using said enclosed loop 118 of said clamp assembly 100 by: sliding a portion of said first loop portion 108 and said second loop portion 110 through said eyelet 1006 of said one or more zippers 1002, securing said mating portion 116 of said first loop portion 108 and said second loop portion 110 together withing said buckle slot 802 and said seat belt receiver buckle slot 804 of said seat belt receiver 104 and said lockable buckle enclosure assembly 800, and preventing the removal of said clamp assembly 100 from said buckle portion 106 using said lockable buckle enclosure assembly 800.

In one embodiment, said bag 1000 can be constructed of a substantially durable and puncture resistant material such as Kevlar®.

Figure 11:
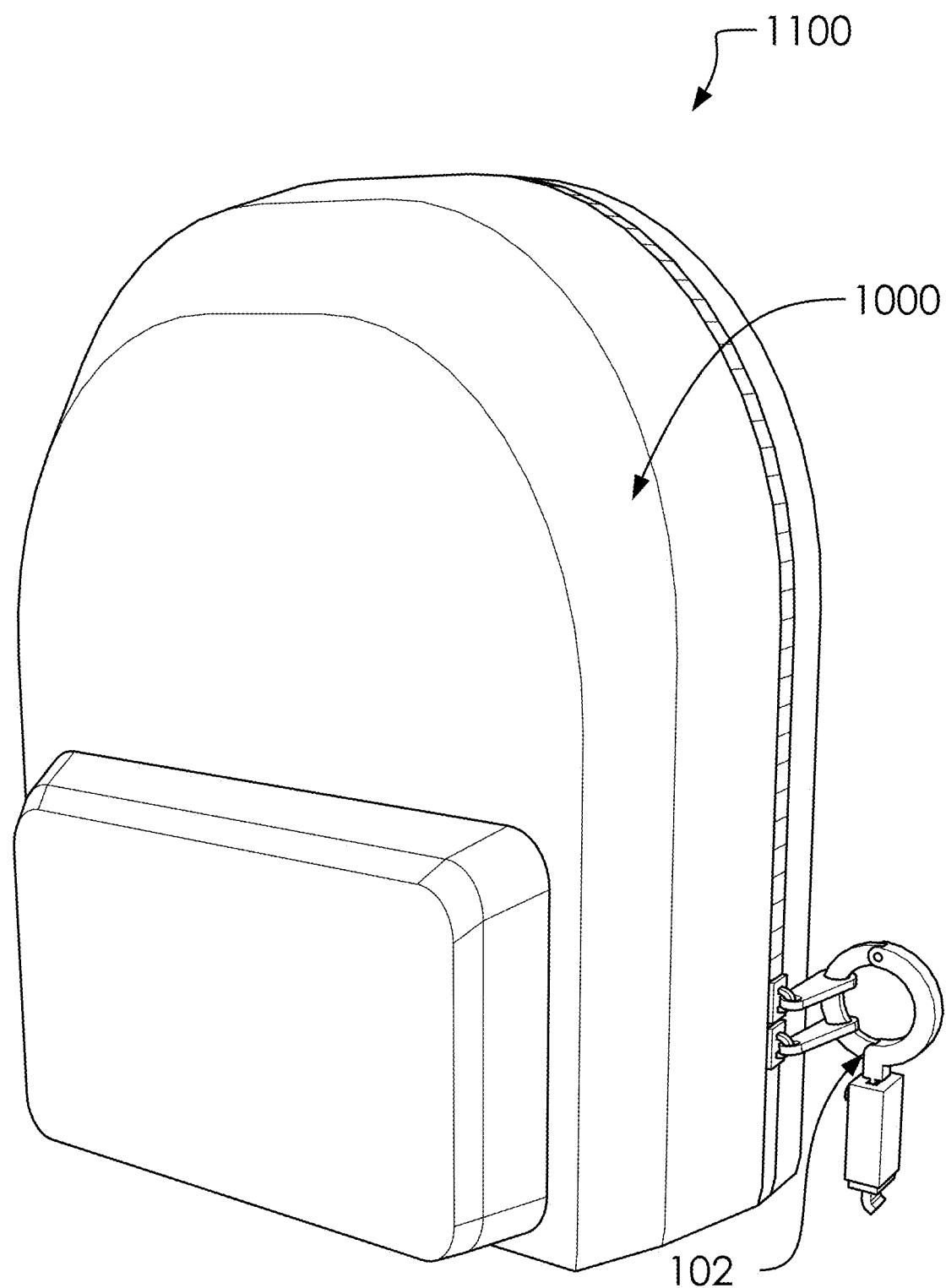
FIG. 11 illustrates a perspective overview of said security assembly 102 with said bag 1000 in an attached configuration 1100.

FIG. 11 illustrates a perspective overview of said security assembly 102 with said bag 1000 in an attached configuration 1100.

In one embodiment, a portion of said first loop portion 108 and said second loop portion 110 can slide through said eyelet 1006 and be securely held together through two or more among said one or more zippers 1002 using said buckle portion 106 inserted into a portion of said lockable buckle enclosure assembly 800.

Accordingly, said clamp assembly 100 can be used in conjunction with said lockable buckle enclosure assembly 800 to secure said bag 1000 to said seat belt receiver 104.

Figure 12A:
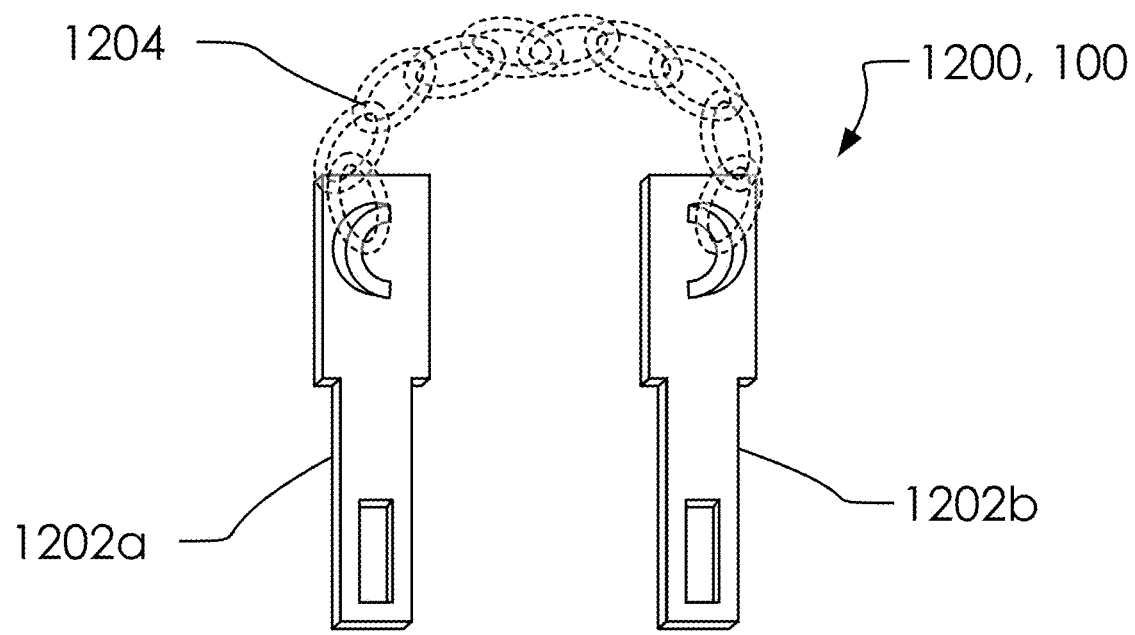
FIGS. 12A and 12B illustrate a chain embodiment 1200 of said clamp assembly 100.
Figure 12B:
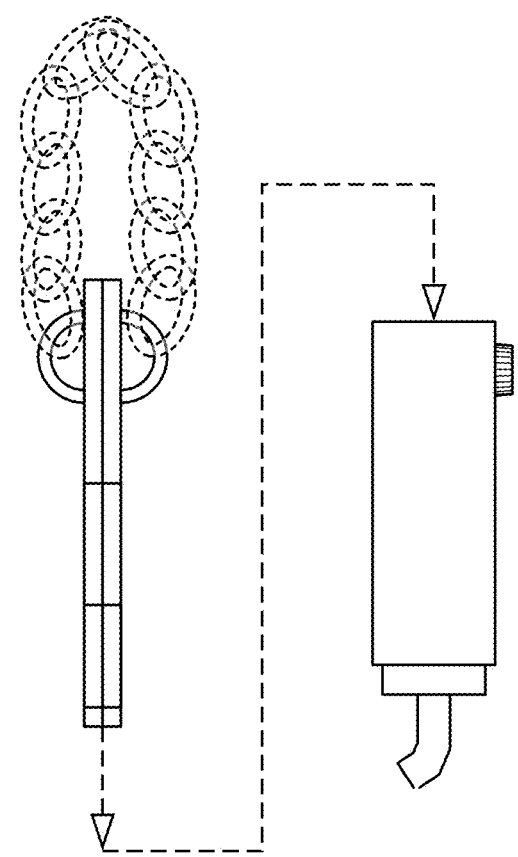

FIGS. 12A and 12B illustrate a chain embodiment 1200 of said clamp assembly 100.

In one embodiment, said chain embodiment 1200 can comprise a first buckle portion 1202a and a second buckle portion 1202b connected together using a chain portion 1204. Wherein, said first buckle portion 1202a and said second buckle portion 1202b can be aligned with one another and inserted into said seat belt receiver 104, using said lockable buckle enclosure assembly 800 to selectively prevent removal from said lockable buckle enclosure assembly 800, as illustrated in FIG. 12B.

Figure 13A:
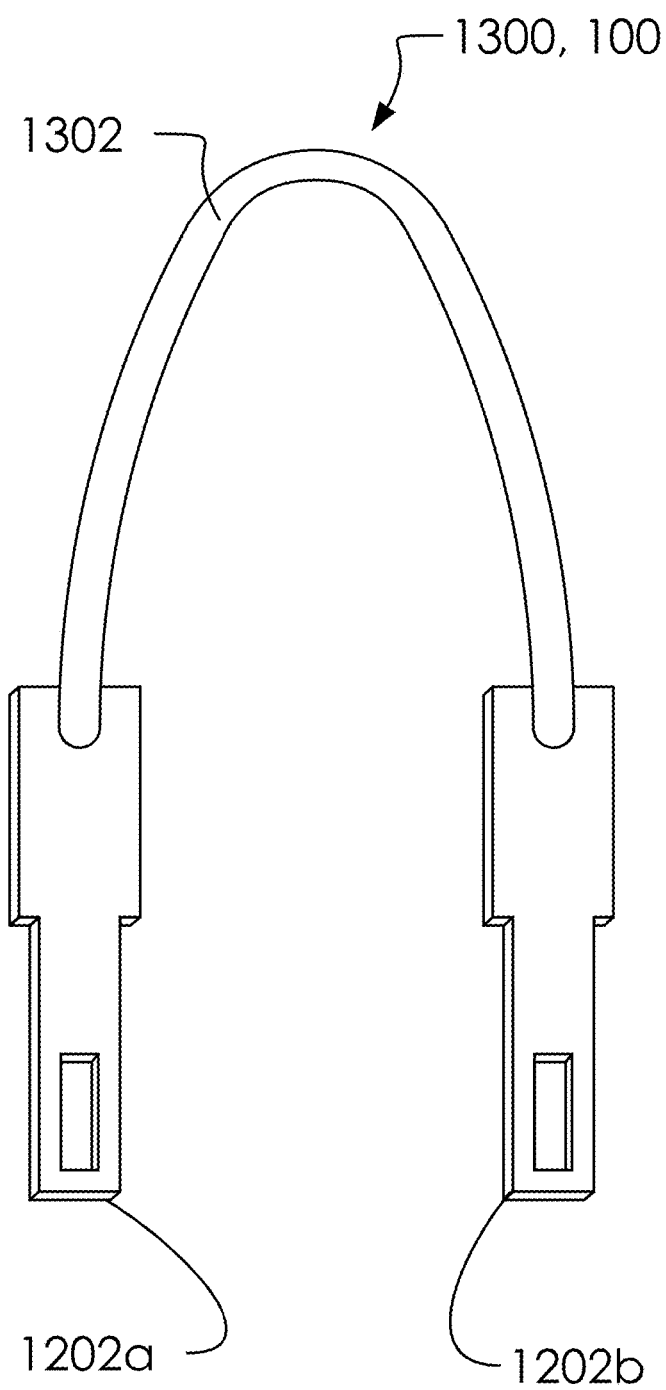
FIGS. 13A and 13B illustrate two perspective overviews of a cable embodiment 1300 of said clamp assembly 100.
Figure 13B:
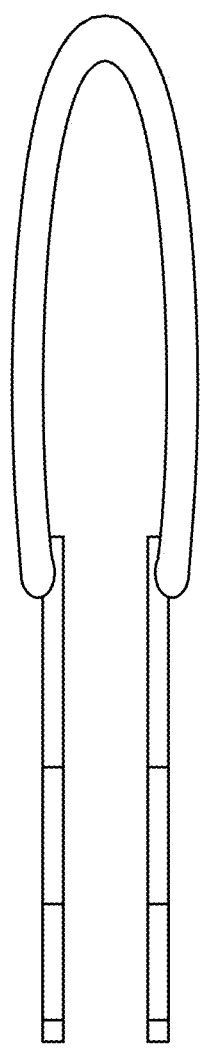

FIGS. 13A and 13B illustrate two perspective overviews of a cable embodiment 1300 of said clamp assembly 100.

In one embodiment, said cable embodiment 1300 can comprise a similar functionality to said chain embodiment

1200, wherein 1 said open configuration 300 can comprise said first buckle portion 1202*a* and said second buckle portion 1202*b* with a cable 1302, as illustrated.

Figure 14A:
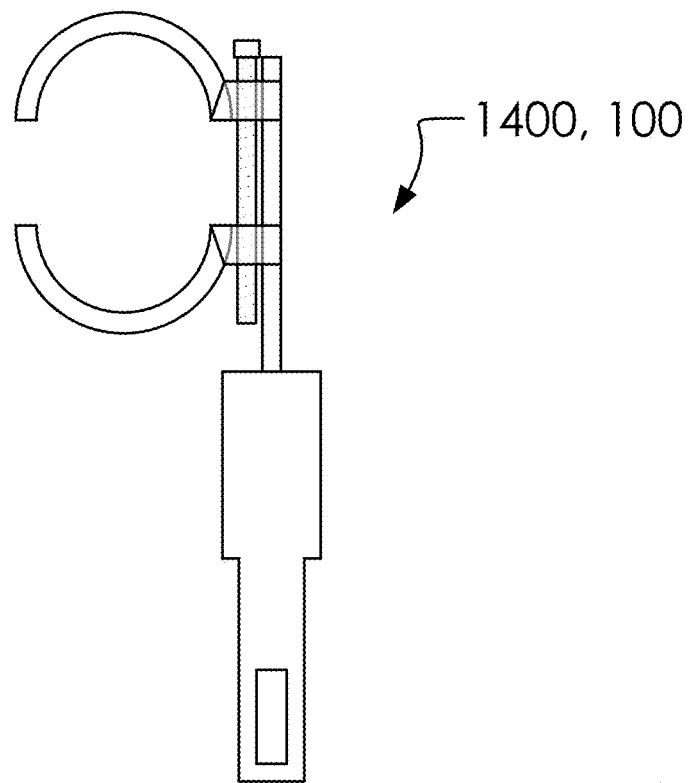
FIGS. 14A and 14B illustrate an elevated front view of a clamp configuration 1400 of said clamp assembly 100.
Figure 14B:
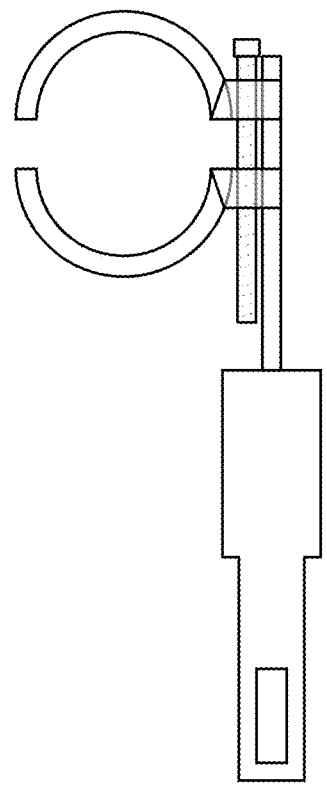

FIGS. 14A and 14B illustrate an elevated front view of a clamp configuration 1400 of said clamp assembly 100.

In one embodiment, 1400/ can used to bolt and screw the clamp all the way down on a firearm or valuable such as 1000/. Accordingly, this can be thought of as a more time-consuming setup.

Figure 15:
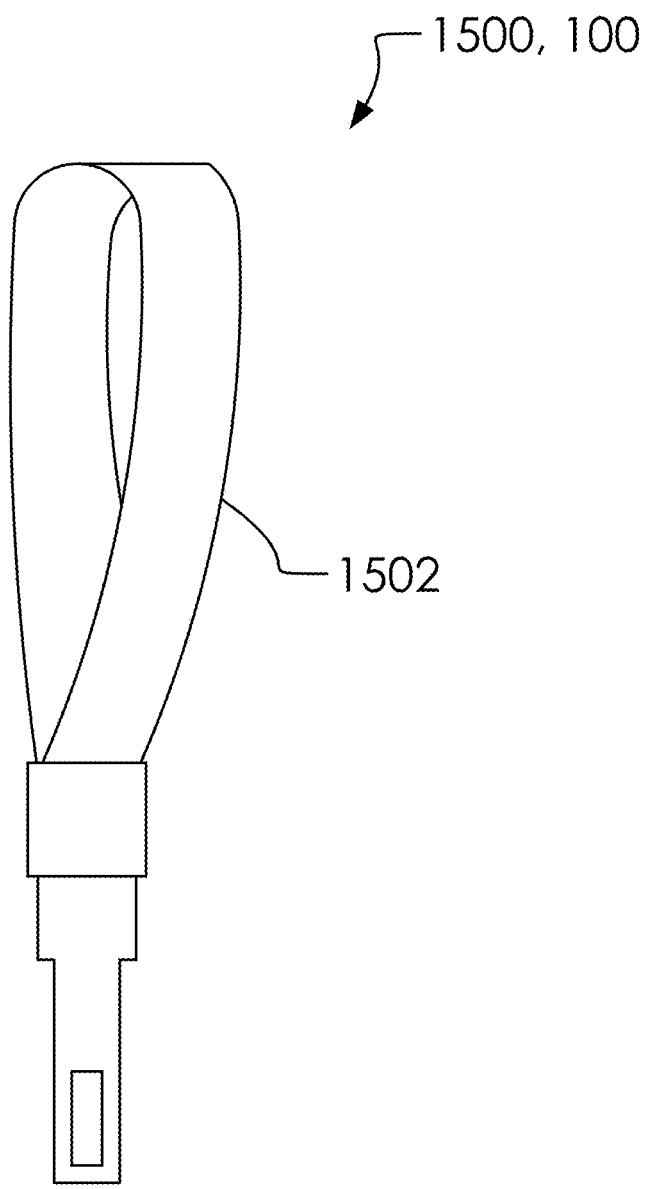
FIG. 15 illustrates an elevated front view of a banded configuration 1500.

FIG. 15 illustrates an elevated front view of a banded configuration 1500.

In one embodiment, said banded configuration 1500 can comprise said clamp assembly 100 comprising a band 1502, which can be made of leather, which can wrap around a valuable.

The leather variant can require cable reinforcement, indicating a need for additional strength. It has a specific indentation on the bottom, likely for a secure fit, and includes a twist-and-pop feature for detachment.

Figure 16A:
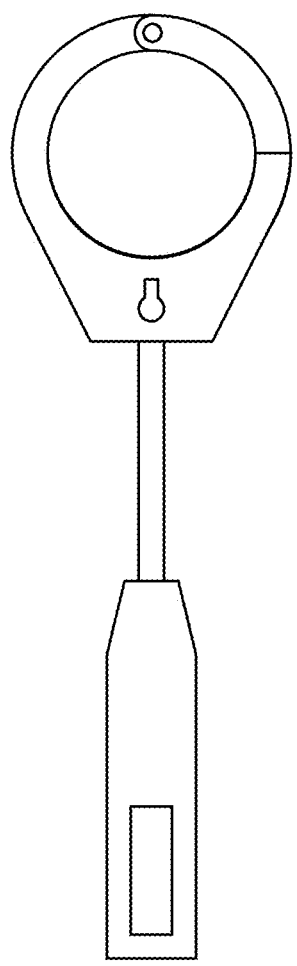
FIGS. 16A and 16B illustrate two elevated front views of a handcuff configuration 1600 of said clamp assembly 100.
Figure 16B:
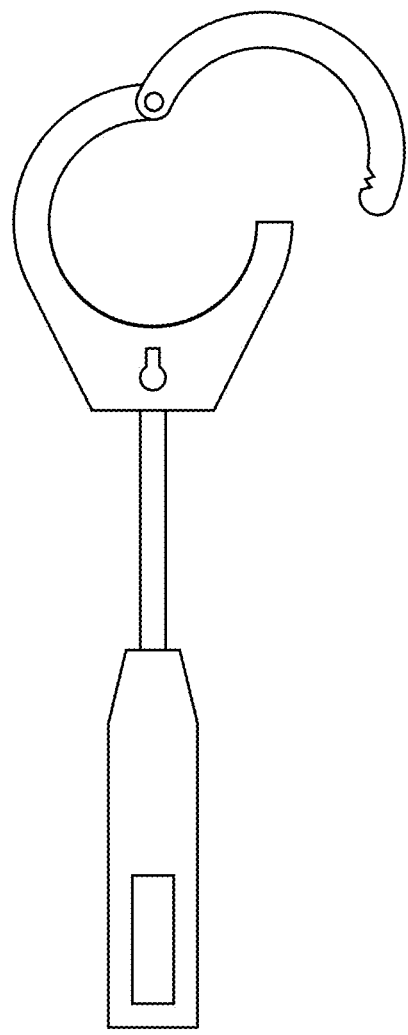

FIGS. 16A and 16B illustrate two elevated front views of a handcuff configuration 1600 of said clamp assembly 100.

Figure 17:
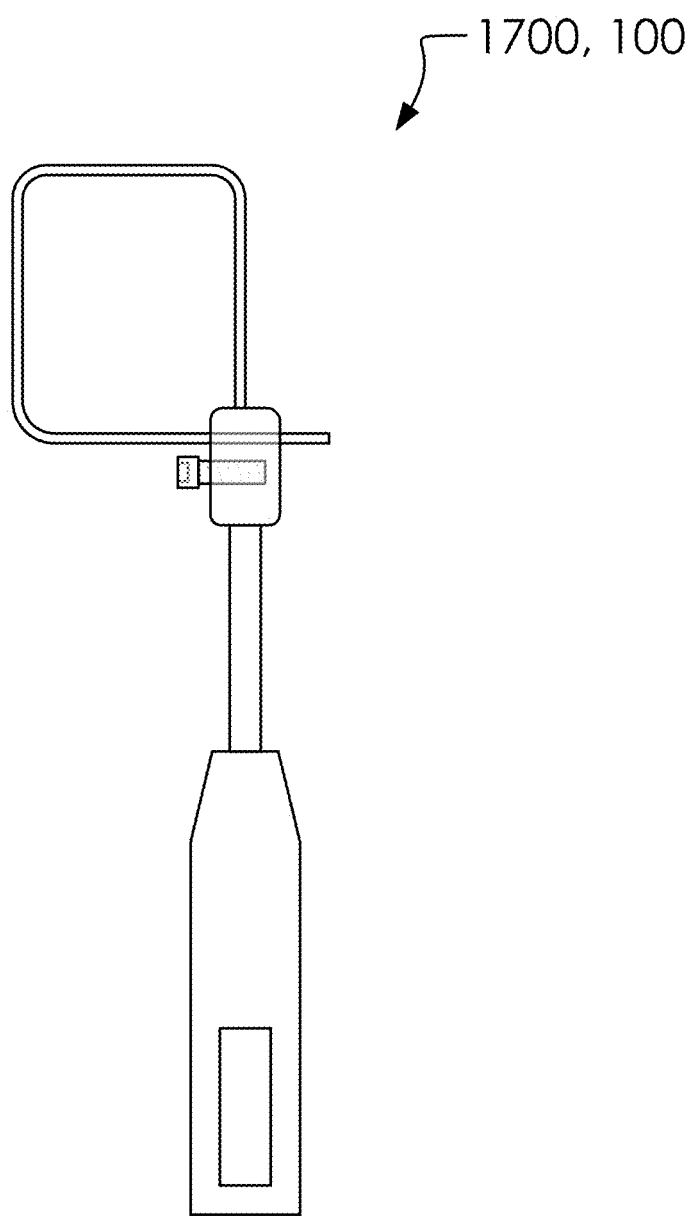
FIG. 17 illustrates an elevated front view of a screw strap configuration 1700 of said clamp assembly 100.

FIG. 17 illustrates an elevated front view of a screw strap configuration 1700 of said clamp assembly 100.

Figure 18:
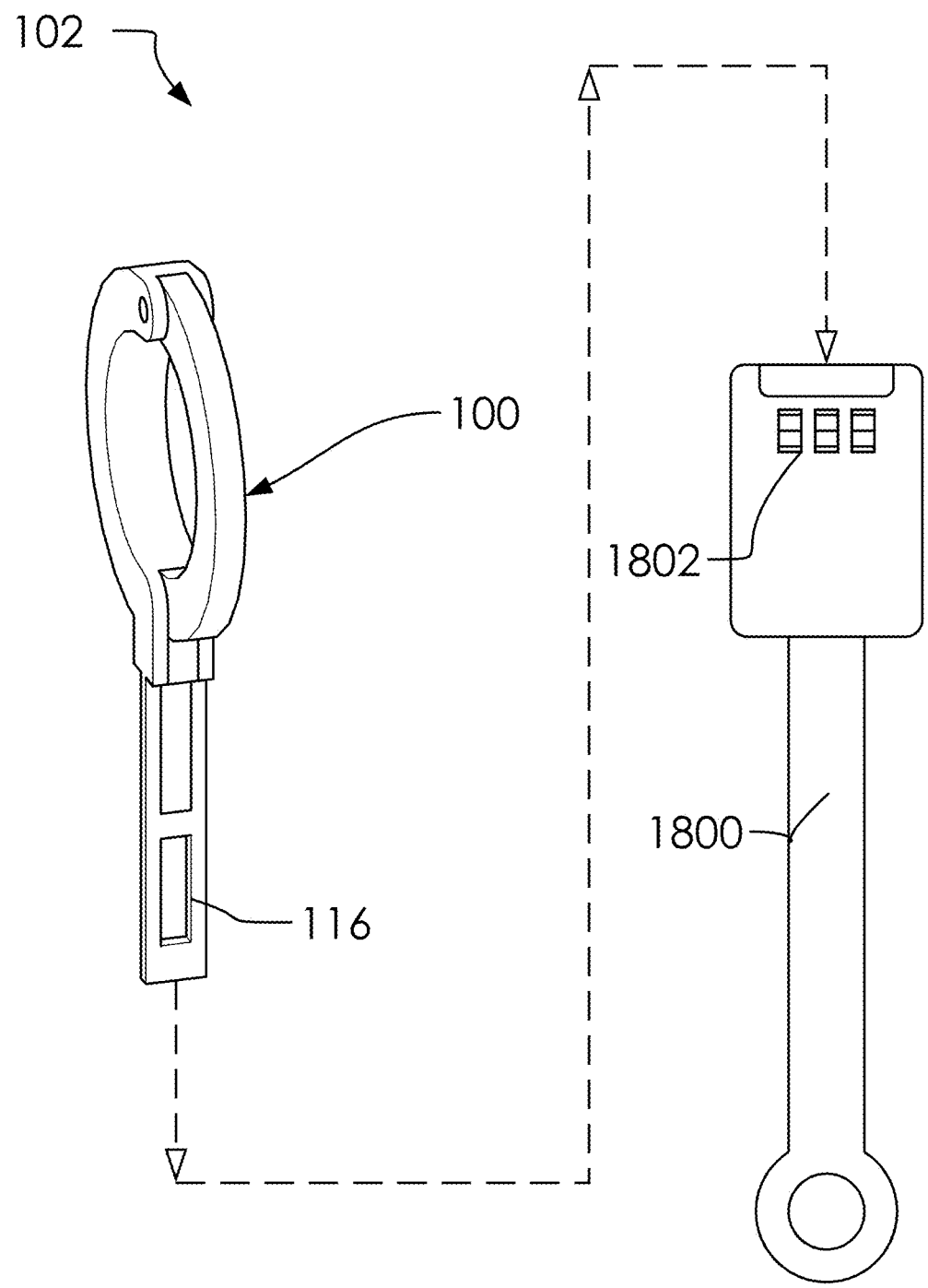
FIG. 18 illustrates a perspective overview of said clamp assembly 100 with a locking buckle receiver 1800.

FIG. 18 illustrates a perspective overview of said clamp assembly 100 with a locking buckle receiver 1800.

In one embodiment, said locking buckle receiver 1800 can comprise a combination lock 1802, as disclosed in one of the parent applications to this filing.

In one embodiment, said clamp assembly 100 can be inserted into said locking buckle receiver 1800 and locked into place using said combination lock 1802.

Parts list:
said clamp assembly 100,
said enclosed configuration 120,
said security assembly 102,
said seat belt receiver 104,
said buckle portion 106,
said first loop portion 108,
said second loop portion 110,
said hinge 112,
said hinge axis 114,
said mating portion 116,
said enclosed loop 118,
said proximate end 124,
said distal end 122,
said second configuration 200,
said open configuration 300,
said tab portion 500,
said slot portion 502,
said buckle thickness 700,
said lockable buckle enclosure assembly 800,
said buckle receiver cavity 808,
said sidewall 810,
said top portion 812,
said buckle slot 802,
said seat belt receiver buckle slot 804,
said combination lock 806,
said bag 1000,
said one or more zippers 1002,
said first zipper 1002*a*,
said second zipper 1002*b*,
said zipper slider 1004,
said eyelet 1006,
said attached configuration 1100,
said chain embodiment 1200,
said first buckle portion 1202*a*,
said second buckle portion 1202*b*,
said chain portion 1204,
said cable embodiment 1300,
said cable 1302,
said clamp configuration 1400,
said banded configuration 1500,
said band 1502,
said handcuff configuration 1600,
said screw strap configuration 1700,
said locking buckle receiver 1800, and
said combination lock 1802.

The following comprises a preferred embodiment of the current disclosure as presented in the original claims.

Said security assembly 102 configured to interface with said seat belt receiver 104 for securing items within a vehicle. Said security assembly 102 comprises said clamp assembly 100. Said clamp assembly 100 comprises said buckle portion 106, said first loop portion 108, said second loop portion 110. Said clamp assembly 100 can be adjustable between said enclosed configuration 120 and said open configuration 300 to accommodate various securement needs. Said first loop portion 108 and said second loop portion 110 can be rotateably attached to one another with said hinge 112 and selectively rotate about said hinge axis 114. Said clamp assembly 100 comprises said enclosed configuration 120 and said open configuration 300. Said enclosed configuration 120 comprises said first loop portion 108 and said second loop portion 110 selectively transitioned to enclose said enclosed loop 118 between said enclosed configuration 120 and said open configuration 300. With said first loop portion 108 and said second loop portion 110 in said enclosed configuration 120, said clamp assembly 100 comprises said enclosed loop 118 within said first loop portion 108 and said second loop portion 110. Said clamp assembly 100 further comprise said mating portion 116. Said buckle portion 106 and said first loop portion 108 comprise a solid piece. Said buckle portion 106 extends down from said enclosed loop 118. Said buckle portion 106 can be configured to selectively mate with said seat belt receiver 104. With said first loop portion 108 and said second loop portion 110 in said enclosed configuration 120, said enclosed loop 118 comprises a substantially round shape with said first loop portion 108 and said second loop portion 110 comprise an exterior shape around said enclosed loop 118. Said second loop portion 110 comprises said proximate end 124 rotateably attached to said hinge 112 and said distal end 122 selectively attached to a portion of said first loop portion 108. Said second loop portion 110 rotates about said hinge axis 114 and connects with said first loop portion 108 at said distal end 122. Said mating portion 116 comprises a portion of said distal end 122 of said second loop portion 110 which connects with said buckle portion 106 and said first loop portion 108.

Said security assembly 102 configured to interface with said seat belt receiver 104 for securing items within a vehicle. Said security assembly 102 comprises said clamp assembly 100. Said clamp assembly 100 comprises said buckle portion 106, said first loop portion 108, said second loop portion 110. Said clamp assembly 100 can be adjustable between said enclosed configuration 120 and said open configuration 300 to accommodate various securement needs. Said first loop portion 108 and said second loop portion 110 can be rotateably attached to one another with said hinge 112 and selectively rotate about said hinge axis 114. Said clamp assembly 100 comprises said enclosed configuration 120 and said open configuration 300. Said enclosed configuration 120 comprises said first loop portion 108 and said second loop portion 110 selectively transitioned to enclose said enclosed loop 118 between said enclosed configuration 120 and said open configuration 300. With said first loop portion 108 and said second loop portion 110 in said enclosed configuration 120, said clamp assembly 100 comprises said enclosed loop 118 within said first loop portion 108 and said second loop portion 110. Said clamp assembly 100 further comprise said mating portion 116. Said buckle portion 106 and said first loop portion 108 comprise a solid piece. Said buckle portion 106 extends down from said enclosed loop 118. Said buckle portion 106 can be configured to selectively mate with said seat belt receiver 104. With said first loop portion 108 and said second loop portion 110 in said enclosed configuration 120, said enclosed loop 118 comprises a substantially round shape with said first loop portion 108 and said second loop portion 110 comprise an exterior shape around said enclosed loop 118. Said second loop portion 110 comprises said proximate end 124 rotateably attached to said hinge 112 and said distal end 122 selectively attached to a portion of said first loop portion 108. Said second loop portion 110 rotates about said hinge axis 114 and connects with said first loop portion 108 at said distal end 122. Said mating portion 116 comprises a portion of said distal end 122 of said second loop portion 110 which connects with said buckle portion 106 and said first loop portion 108.

Said security assembly 102 configured to interface with said seat belt receiver 104 for securing items within a vehicle. Said security assembly 102 comprises said clamp assembly 100. Said clamp assembly 100 comprises said buckle portion 106, said first loop portion 108, said second loop portion 110. Said clamp assembly 100 can be adjustable between said enclosed configuration 120 and said open configuration 300 to accommodate various securement needs. Said first loop portion 108 and said second loop portion 110 can be rotateably attached to one another with said hinge 112 and selectively rotate about said hinge axis 114. Said clamp assembly 100 comprises said enclosed configuration 120 and said open configuration 300. Said enclosed configuration 120 comprises said first loop portion 108 and said second loop portion 110 selectively transitioned to enclose said enclosed loop 118 between said enclosed configuration 120 and said open configuration 300. With said first loop portion 108 and said second loop portion 110 in said enclosed configuration 120, said clamp assembly 100 comprises said enclosed loop 118 within said first loop portion 108 and said second loop portion 110.

Said clamp assembly 100 further comprise said mating portion 116. Said buckle portion 106 and said first loop portion 108 comprise a solid piece. Said buckle portion 106 extends down from said enclosed loop 118. Said buckle portion 106 can be configured to selectively mate with said seat belt receiver 104. With said first loop portion 108 and said second loop portion 110 in said enclosed configuration 120, said enclosed loop 118 comprises a substantially round shape with said first loop portion 108 and said second loop portion 110 comprise an exterior shape around said enclosed loop 118. Said second loop portion 110 comprises said proximate end 124 rotateably attached to said hinge 112 and said distal end 122 selectively attached to a portion of said first loop portion 108. Said second loop portion 110 rotates about said hinge axis 114 and connects with said first loop portion 108 at said distal end 122. Said mating portion 116 comprises a portion of said distal end 122 of said second loop portion 110 which connects with said buckle portion 106 and said first loop portion 108.

Said mating portion 116 comprises said tab portion 500 and said slot portion 502 that selectively fit into one another to secure said clamp assembly 100 in said enclosed configuration 120.

Said mating portion 116 comprises said tab portion 500 and said slot portion 502. Said tab portion 500 and said slot portion 502 can selectively fit into one another when said second loop portion 110 can be in said enclosed configuration 120. Said tab portion 500 and said slot portion 502 can be arranged on said first loop portion 108 and said second loop portion 110.

With said tab portion 500 in said slot portion 502, said mating portion 116 comprises a slim profile being substantially equal thickness with said buckle thickness 700 of said buckle portion 106.

Said security assembly 102 further comprises said lockable buckle enclosure assembly 800. Said lockable buckle enclosure assembly 800 can be configured to selectively prevent removal of said clamp assembly 100 from said seat belt receiver 104. Said lockable buckle enclosure assembly 800 comprises said buckle slot 802. Said lockable buckle enclosure assembly 800 comprises said buckle slot 802, said buckle receiver cavity 808. Said buckle receiver cavity 808 can be enclosed on its side by said sidewall 810 and about said top portion 812 with a top wall comprising said seat belt receiver buckle slot 804. Said lockable buckle enclosure assembly 800 can be configured to enclose said seat belt receiver buckle slot 804 of said seat belt receiver 104 and a top portion of said seat belt receiver 104 to selectively prevent release of said lockable buckle enclosure assembly 800 from said seat belt receiver 104 with said clamp assembly 100 attached to said seat belt receiver 104.

Said lockable buckle enclosure assembly 800 further comprises said combination lock 806. Said combination lock 806 can be configured to selectively trigger said seat belt receiver buckle slot 804 to release said mating portion 116 from said seat belt receiver buckle slot 804 of said seat belt receiver 104.

Said security assembly 102 further configured for securing said bag 1000 within a vehicle. Said bag 1000 comprises said one or more zippers 1002 each having said zipper slider 1004 equipped with said eyelet 1006. Said clamp assembly 100 can be configured to secure said bag 1000 by: sliding said first loop portion 108 and said second loop portion 110 through said eyelet 1006 of said one or more zippers 1002 on said bag 1000, securing said mating portion 116 of said first loop portion 108 and said second loop portion 110 together within said buckle slot 802 and said seat belt receiver buckle slot 804 of said seat belt receiver 104 and said lockable buckle enclosure assembly 800, and preventing the removal of said clamp assembly 100 from said buckle portion 106 using said lockable buckle enclosure assembly 800.

Said bag 1000 can be secured to said security assembly 102 using said enclosed loop 118 of said clamp assembly 100 by: sliding a portion of said first loop portion 108 and said second loop portion 110 through said eyelet 1006 of said one or more zippers 1002, securing said mating portion 116 of said first loop portion 108 and said second loop portion 110 together withing said buckle slot 802 and said seat belt receiver buckle slot 804 of said seat belt receiver 104 and said lockable buckle enclosure assembly 800, and preventing the removal of said clamp assembly 100 from said buckle portion 106 using said lockable buckle enclosure assembly 800.

Said bag 1000 can be constructed of a substantially durable and puncture resistant.

A portion of said first loop portion 108 and said second loop portion 110 can slide through said eyelet 1006 and be securely held together through two or more among said one or more zippers 1002 using said buckle portion 106 inserted into a portion of said lockable buckle enclosure assembly 800. Accordingly, said clamp assembly 100 can be used in conjunction with said lockable buckle enclosure assembly 800 to secure said bag 1000 to said seat belt receiver 104.

Said locking buckle receiver 1800 comprises said combination lock 1802, as disclosed in one of the parent applications to this filing. Said clamp assembly 100 can be inserted into said locking buckle receiver 1800 and locked into place using said combination lock 1802.

Said security assembly 102 configured to interface with said seat belt receiver 104 for securing items within a vehicle. Said security assembly 102 comprises said clamp assembly 100. Said clamp assembly 100 comprises said buckle portion 106, said first loop portion 108, said second loop portion 110. Said clamp assembly 100 can be adjustable between said enclosed configuration 120 and said open configuration 300 to accommodate various securement needs. Said first loop portion 108 and said second loop portion 110 can be rotateably attached to one another with said hinge 112 and selectively rotate about said hinge axis 114. Said clamp assembly 100 comprises said enclosed configuration 120 and said open configuration 300. Said enclosed configuration 120 comprises said first loop portion 108 and said second loop portion 110 selectively transitioned to enclose said enclosed loop 118 between said enclosed configuration 120 and said open configuration 300. With said first loop portion 108 and said second loop portion 110 in said enclosed configuration 120, said clamp assembly 100 comprises said enclosed loop 118 within said first loop portion 108 and said second loop portion 110. Said mating portion 116 comprises said tab portion 500 and said slot portion 502 that selectively fit into one another to secure said clamp assembly 100 in said enclosed configuration 120. Said mating portion 116 comprises said tab portion 500 and said slot portion 502. Portion (110) can be in said enclosed configuration 120. Said tab portion 500 and said slot portion 502 can be arranged on said first loop portion 108 and said second loop portion 110.

With said tab portion 500 in said slot portion 502, said mating portion 116 comprises a slim profile being substantially equal thickness with said buckle thickness 700 of said buckle portion 106.

Said security assembly 102 further comprises said lockable buckle enclosure assembly 800. Said lockable buckle enclosure assembly 800 can be configured to selectively prevent removal of said clamp assembly 100 from said seat belt receiver 104. Said lockable buckle enclosure assembly 800 comprises said buckle slot 802. Said lockable buckle enclosure assembly 800 comprises said buckle slot 802, said buckle receiver cavity 808. Said buckle receiver cavity 808 can be enclosed on its side by said sidewall 810 and about said top portion 812 with a top wall comprising said seat belt receiver buckle slot 804. Said lockable buckle enclosure assembly 800 can be configured to enclose said seat belt receiver buckle slot 804 of said seat belt receiver 104 and a top portion of said seat belt receiver 104 to selectively prevent release of said lockable buckle enclosure assembly 800 from said seat belt receiver 104 with said clamp assembly 100 attached to said seat belt receiver 104.

Said lockable buckle enclosure assembly 800 further comprises said combination lock 806. Said combination lock 806 can be configured to selectively trigger said seat belt receiver buckle slot 804 to release said mating portion 116 from said seat belt receiver buckle slot 804 of said seat belt receiver 104.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A security assembly configured to interface with a seat belt receiver for securing items within a vehicle, wherein:
    said security assembly comprises a clamp assembly;
    said clamp assembly comprises a buckle portion, a first loop portion, a second loop portion;
    said clamp assembly is adjustable between an enclosed configuration and an open configuration to accommodate various securement needs;
    said first loop portion and said second loop portion are rotatably attached to one another with a hinge and selectively rotate about a hinge axis;
    said clamp assembly comprises said enclosed configuration and said open configuration;
    said enclosed configuration comprises said first loop portion and said second loop portion selectively transitioned to enclose an enclosed loop
    between said enclosed configuration and said open configuration;
    with said first loop portion and said second loop portion in said enclosed configuration, said clamp assembly comprises said enclosed loop within said first loop portion and said second loop portion;
    said clamp assembly further comprises a mating portion;
    said buckle portion and said first loop portion comprise a solid piece;
    said buckle portion extends down from said enclosed loop;
    said buckle portion is configured to selectively mate with said seat belt receiver;
    with said first loop portion and said second loop portion in said enclosed configuration, said enclosed loop comprises a substantially round shape with said first loop portion and said second loop portion comprise an exterior shape around said enclosed loop;
    said second loop portion comprises a proximate end rotateably attached to said hinge and a distal end selectively attached to a portion of said first loop portion;
    said second loop portion rotates about said hinge axis and connects with said first loop portion at said distal end; and
    said mating portion comprises a portion of said distal end of said second loop portion which connects with said buckle portion and said first loop portion.

2. A security assembly configured to interface with a seat belt receiver for securing items within a vehicle, wherein:
said security assembly comprises a clamp assembly;
said clamp assembly comprises a buckle portion, a first loop portion, a second loop portion;
said clamp assembly is adjustable between an enclosed configuration and an open configuration to accommodate various securement needs;
said first loop portion and said second loop portion are rotateably attached to one another with a hinge and selectively rotate about a hinge axis;
said clamp assembly comprises said enclosed configuration and said open configuration;
said enclosed configuration comprises said first loop portion and said second loop portion selectively transitioned to enclose an enclosed loop
between said enclosed configuration and said open configuration; and
with said first loop portion and said second loop portion in said enclosed configuration, said clamp assembly comprises said enclosed loop within said first loop portion and said second loop portion.

3. The security assembly of claim 2, wherein:
said clamp assembly further comprise a mating portion;
said buckle portion and said first loop portion comprise a solid piece;
said buckle portion extends down from said enclosed loop;
said buckle portion is configured to selectively mate with said seat belt receiver;
with said first loop portion and said second loop portion in said enclosed configuration, said enclosed loop comprises a substantially round shape with said first loop portion and said second loop portion comprise an exterior shape around said enclosed loop;
said second loop portion comprises a proximate end rotateably attached to said hinge and a distal end selectively attached to a portion of said first loop portion;
said second loop portion rotates about said hinge axis and connects with said first loop portion at said distal end; and
said mating portion comprises a portion of said distal end of said second loop portion which connects with said buckle portion and said first loop portion.

4. The security assembly of claim 2, wherein:
said mating portion comprises a tab portion and a slot portion that selectively fit into one another to secure said clamp assembly in said enclosed configuration.

5. The security assembly of claim 4, wherein:
said mating portion comprises said tab portion and said slot portion;
said tab portion and said slot portion can selectively fit into one another when said second loop portion is in said enclosed configuration; and
said tab portion and said slot portion is arranged on said first loop portion and said second loop portion.

6. The security assembly of claim 4, wherein:
with said tab portion in said slot portion, said mating portion comprises a slim profile being substantially equal thickness with a buckle thickness of said buckle portion.

7. The security assembly of claim 2, wherein:
said security assembly further comprises a lockable buckle enclosure assembly;
said lockable buckle enclosure assembly is configured to selectively prevent removal of said clamp assembly from said seat belt receiver;
said lockable buckle enclosure assembly comprises a buckle slot;
said lockable buckle enclosure assembly comprises said buckle slot, a buckle receiver cavity;
said buckle receiver cavity is enclosed on its side by a sidewall and about a top portion with a top wall comprising said seat belt receiver buckle slot; and
said lockable buckle enclosure assembly is configured to enclose said seat belt receiver buckle slot of said seat belt receiver and a top portion of said seat belt receiver to selectively prevent release of said lockable buckle enclosure assembly from said seat belt receiver with said clamp assembly attached to said seat belt receiver.

8. The security assembly of claim 4, wherein:
a lockable buckle enclosure assembly further comprises a combination lock; and
said combination lock is configured to selectively trigger a seat belt receiver buckle slot to release said mating portion from said seat belt receiver buckle slot of said seat belt receiver.

9. The security assembly of claim 2, wherein:
said security assembly further configured for securing a bag within a vehicle;
said bag comprises one or more zippers each having a zipper slider equipped with an eyelet; and
said clamp assembly is configured to secure said bag by:
sliding said first loop portion and said second loop portion through said eyelet of said one or more zippers on said bag,
securing said mating portion of said first loop portion and said second loop portion together within said buckle slot and said seat belt receiver buckle slot of said seat belt receiver and said lockable buckle enclosure assembly, and
preventing the removal of said clamp assembly from said buckle portion using said lockable buckle enclosure assembly.

10. The security assembly of claim 9, wherein:
said bag is secured to said security assembly using said enclosed loop of said clamp assembly by:
sliding a portion of said first loop portion and said second loop portion through said eyelet of said one or more zippers,
securing said mating portion of said first loop portion and said second loop portion together withing said buckle slot and said seat belt receiver buckle slot of said seat belt receiver and said lockable buckle enclosure assembly, and
preventing the removal of said clamp assembly from said buckle portion using said lockable buckle enclosure assembly.

11. The security assembly of claim 9, wherein:
said bag is constructed of a substantially durable and puncture resistant.

12. The security assembly of claim 9, wherein:
a portion of said first loop portion and said second loop portion can slide through said eyelet and be securely held together through two or more among said one or more zippers using said buckle portion inserted into a portion of said lockable buckle enclosure assembly; and
said clamp assembly is used in conjunction with said lockable buckle enclosure assembly to secure said bag to said seat belt receiver.

13. The security assembly of claim 2, wherein:
a locking buckle receiver comprises a combination lock, as disclosed in one of the parent applications to this filing; and
said clamp assembly is inserted into said locking buckle receiver and locked into place using said combination lock.

14. A security assembly configured to interface with a seat belt receiver for securing items within a vehicle, wherein:
said security assembly comprises a clamp assembly;
said clamp assembly comprises a buckle portion, a first loop portion, a second loop portion;
said clamp assembly is adjustable between an enclosed configuration and an open configuration to accommodate various securement needs;
said first loop portion and said second loop portion are rotateably attached to one another with a hinge and selectively rotate about a hinge axis;
said clamp assembly comprises said enclosed configuration and said open configuration;
said enclosed configuration comprises said first loop portion and said second loop portion selectively transitioned to enclose an enclosed loop;
between said enclosed configuration and said open configuration;
with said first loop portion and said second loop portion in said enclosed configuration, said clamp assembly comprises said enclosed loop within said first loop portion and said second loop portion;
a mating portion comprises a tab portion and a slot portion that selectively fit into one another to secure said clamp assembly in said enclosed configuration;
said mating portion comprises said tab portion and said slot portion; and
said tab portion and said slot portion is arranged on said first loop portion and said second loop portion.

15. The security assembly of claim 14, wherein:
with said tab portion in said slot portion, said mating portion comprises a slim profile being substantially equal thickness with a buckle thickness of said buckle portion.

16. The security assembly of claim 14, wherein:
said security assembly further comprises a lockable buckle enclosure assembly;
said lockable buckle enclosure assembly is configured to selectively prevent removal of said clamp assembly from said seat belt receiver;
said lockable buckle enclosure assembly comprises a buckle slot;
said lockable buckle enclosure assembly comprises said buckle slot, a buckle receiver cavity;
said buckle receiver cavity is enclosed on its side by a sidewall and about a top portion with a top wall comprising a seat belt receiver buckle slot; and
said lockable buckle enclosure assembly is configured to enclose said seat belt receiver buckle slot of said seat belt receiver and a top portion of said seat belt receiver to selectively prevent release of said lockable buckle enclosure assembly from said seat belt receiver with said clamp assembly attached to said seat belt receiver.

17. The security assembly of claim 14, wherein:
said lockable buckle enclosure assembly further comprises a combination lock; and
said combination lock is configured to selectively trigger said seat belt receiver buckle slot to release said mating portion from said seat belt receiver buckle slot of said seat belt receiver.

18. The security assembly of claim 14, wherein:
said security assembly further configured for securing a bag within a vehicle;
said bag comprises one or more zippers each having a zipper slider equipped with an eyelet; and
said clamp assembly is configured to secure said bag by:
sliding said first loop portion and said second loop portion through said eyelet of said one or more zippers on said bag,
securing said mating portion of said first loop portion and said second loop portion together within said buckle slot and said seat belt receiver buckle slot of said seat belt receiver and said lockable buckle enclosure assembly, and
preventing the removal of said clamp assembly from said buckle portion using said lockable buckle enclosure assembly.

* * * * *